(12) United States Patent
Wada

(10) Patent No.: US 8,023,197 B2
(45) Date of Patent: Sep. 20, 2011

(54) ZOOM LENS AND CAMERA WITH THE SAME

(75) Inventor: Ken Wada, Sakura (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/918,702

(22) PCT Filed: Apr. 20, 2009

(86) PCT No.: PCT/JP2009/001798
§ 371 (c)(1),
(2), (4) Date: Aug. 20, 2010

(87) PCT Pub. No.: WO2009/133665
PCT Pub. Date: Nov. 5, 2009

(65) Prior Publication Data
US 2010/0321790 A1    Dec. 23, 2010

(30) Foreign Application Priority Data

Apr. 28, 2008 (JP) .................................. 2008-117297

(51) Int. Cl.
*G02B 15/14* (2006.01)

(52) U.S. Cl. ........................................ 359/683; 359/690

(58) Field of Classification Search .................. 359/676, 359/683, 687, 690, 680–682
See application file for complete search history.

(56) References Cited

U.S. PATENT DOCUMENTS

| 6,333,823 | B1 | 12/2001 | Ozaki et al. | |
| 7,426,085 | B2 | 9/2008 | Yoshitsugu et al. | |
| 7,692,869 | B2 * | 4/2010 | Yamaguchi et al. | 359/676 |
| 2006/0098306 | A1 | 5/2006 | Yoshitsugu et al. | |
| 2006/0285221 | A1 * | 12/2006 | Bito et al. | 359/676 |

FOREIGN PATENT DOCUMENTS

| JP | 10-020191 A | 1/1998 |
| JP | 2000-187160 A | 7/2000 |
| JP | 2004-102090 A | 4/2004 |
| JP | 2006-259685 A | 9/2006 |

OTHER PUBLICATIONS

International Search Report and Written Opinion issued in related PCT/JP2009/001798, mailed Jul. 21, 2009.

* cited by examiner

*Primary Examiner* — Scott J Sugarman
(74) *Attorney, Agent, or Firm* — Rossi, Kimms & McDowell LLP

(57) ABSTRACT

The zoom lens is a retractable bent-type zoom lens capable of providing a high zoom ratio and a reduced thickness, and capable of retracting into a camera body with an easily-configured mechanism. The zoom lens includes in order from an object side to an image side, a first lens unit having a positive refractive power, a second lens unit having a negative refractive power, a prism including a reflective surface, and a posterior lens group which includes plural lens units and has as a whole a positive refractive power. The first and second lens units are retractable into a space formed by movement of the prism in a direction orthogonal to an optical axis of the first lens unit, and, during zooming, the second lens unit and the plural lens units in the posterior lens group are moved while the first lens unit and the prism are fixed.

16 Claims, 10 Drawing Sheets

[Fig. 1]
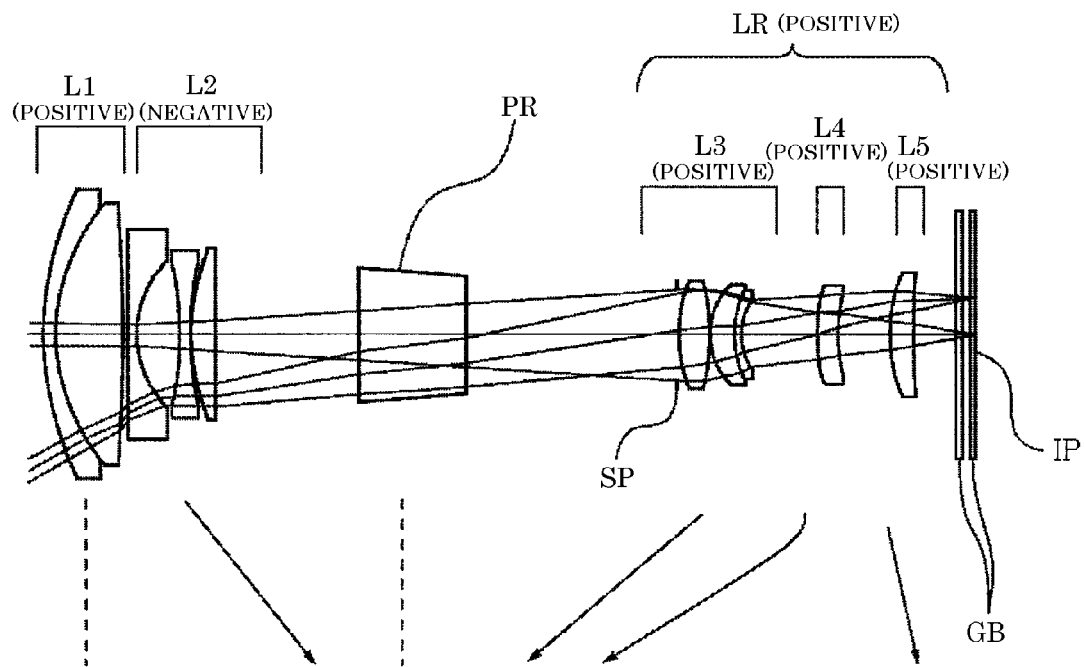
[Fig. 2-A]
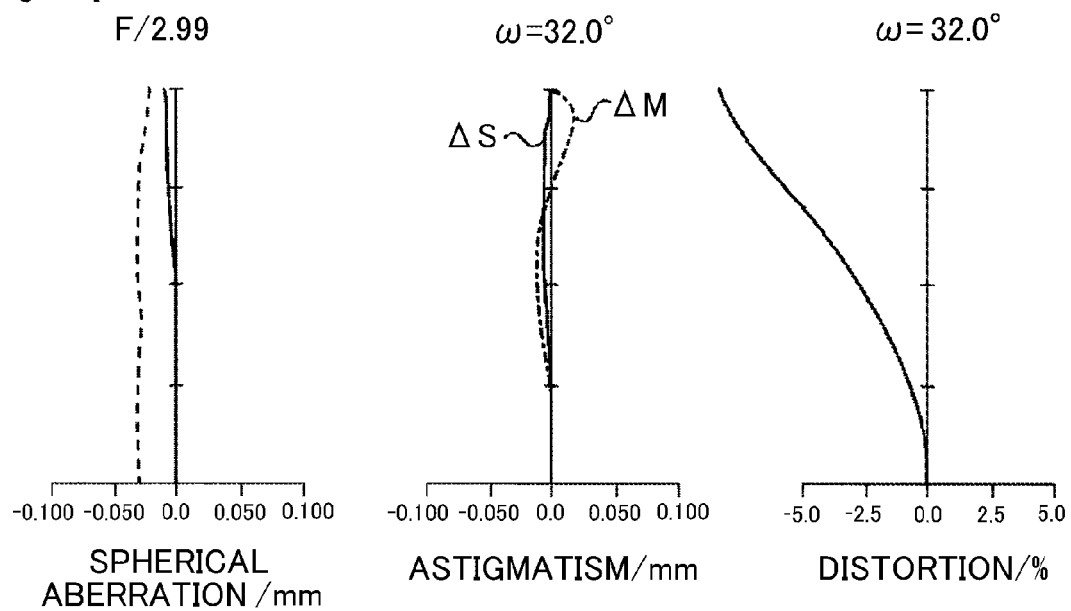

[Fig. 2-B]
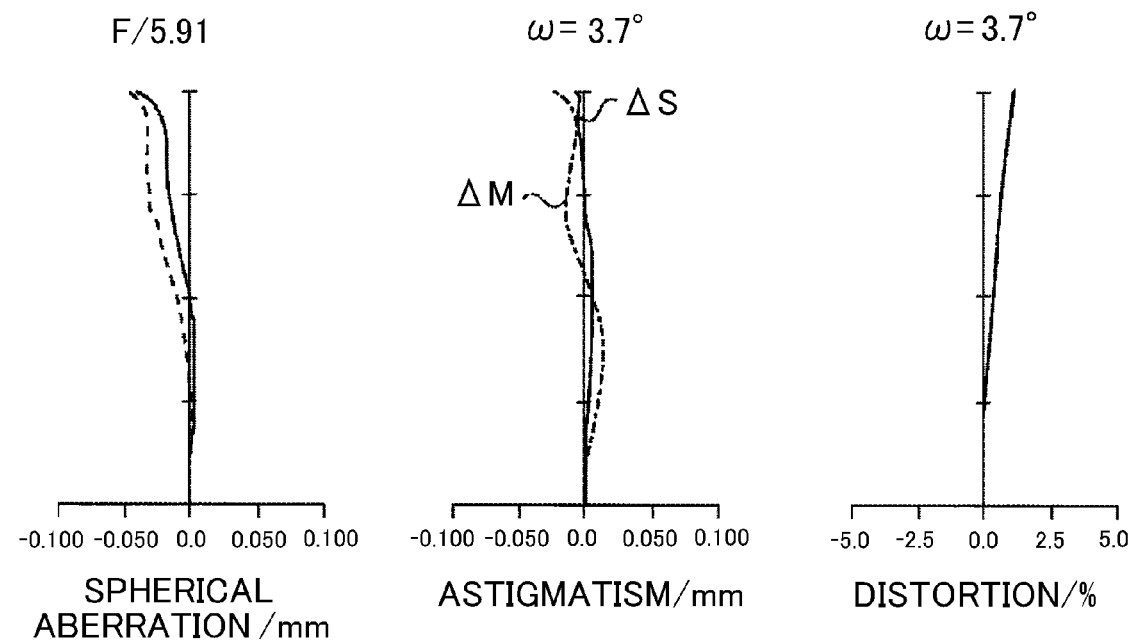
SPHERICAL ABERRATION /mm    ASTIGMATISM/mm    DISTORTION/%
[Fig. 3]
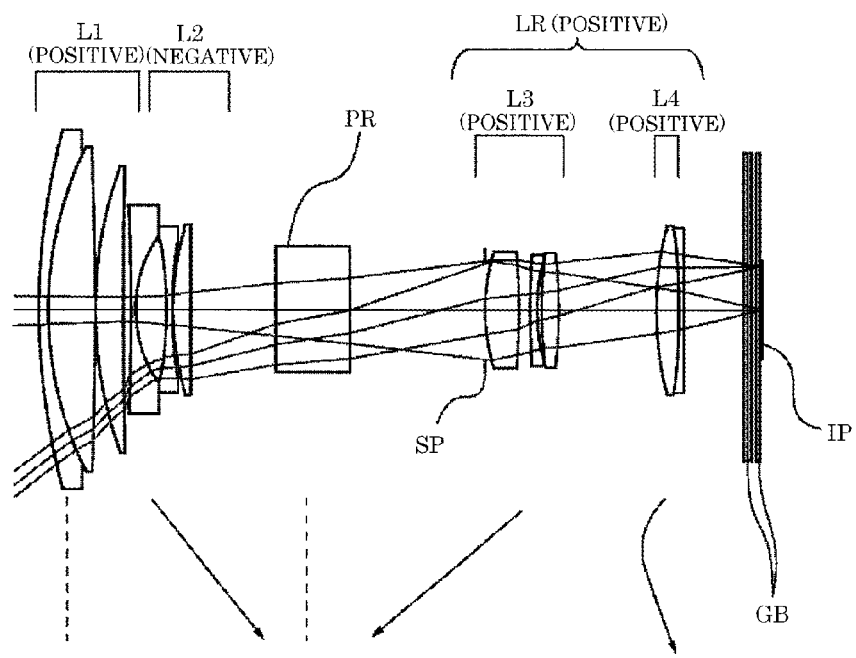

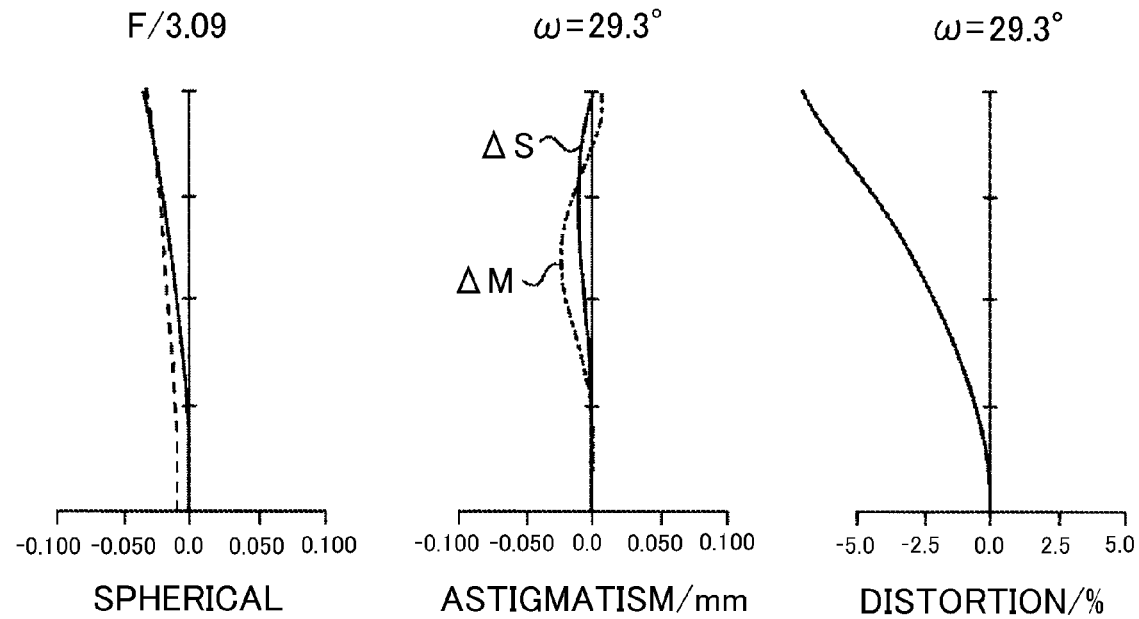
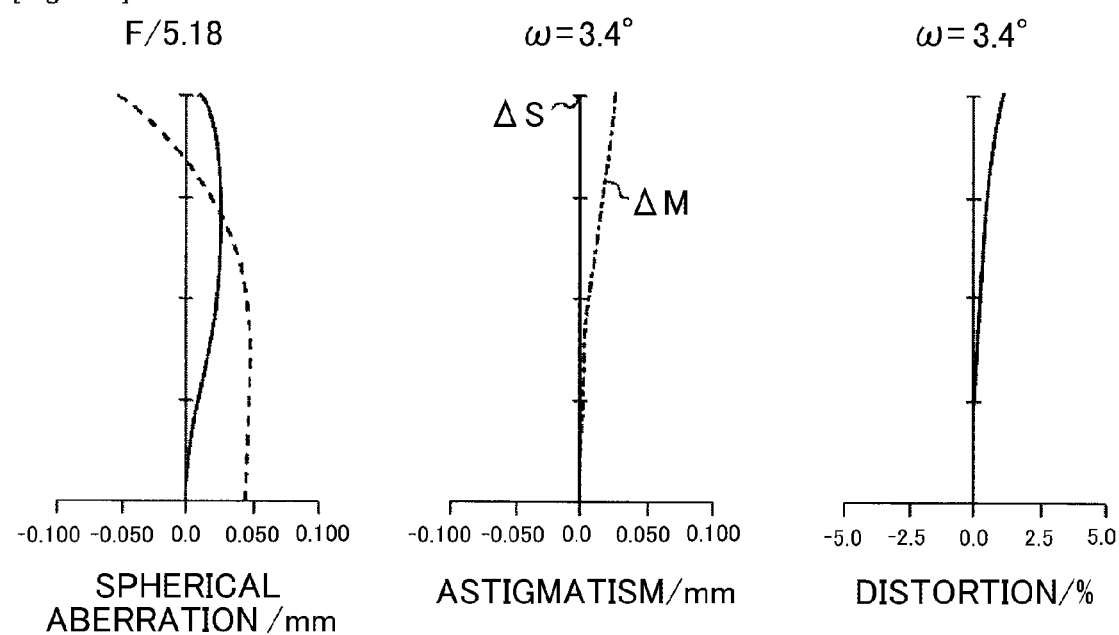

[Fig. 5]
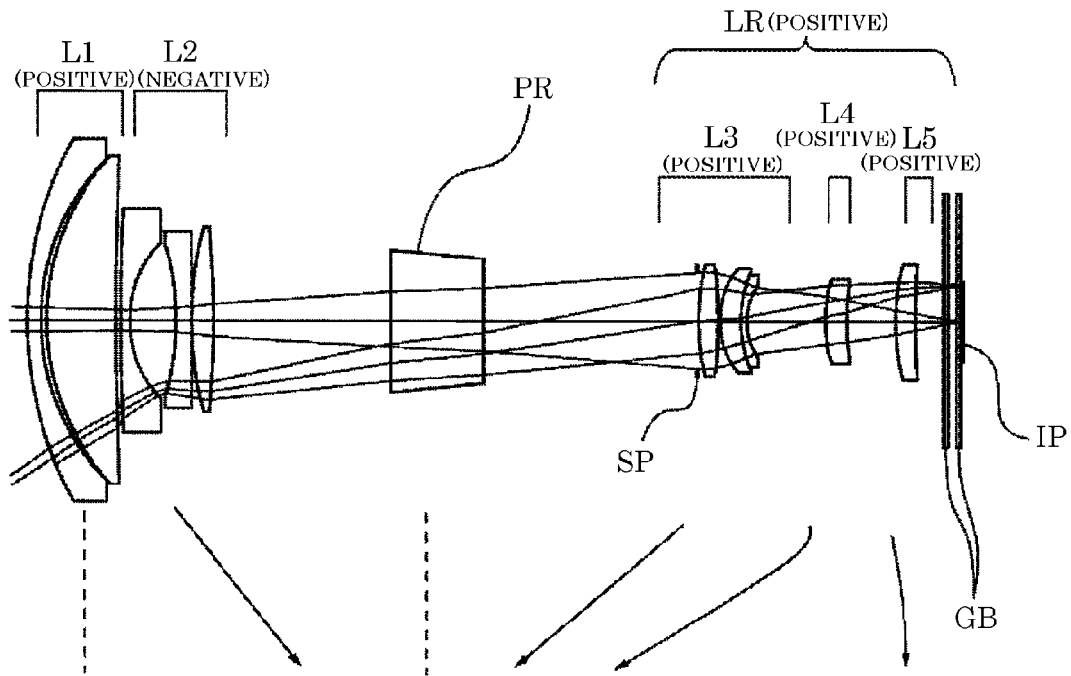
[Fig. 6-A]
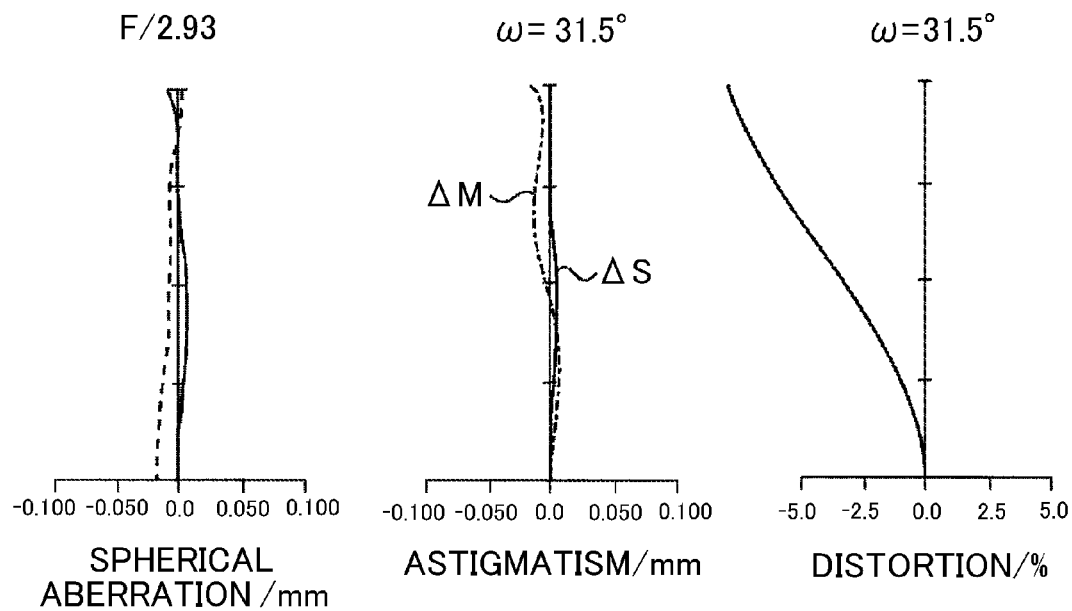

[Fig. 6-B]
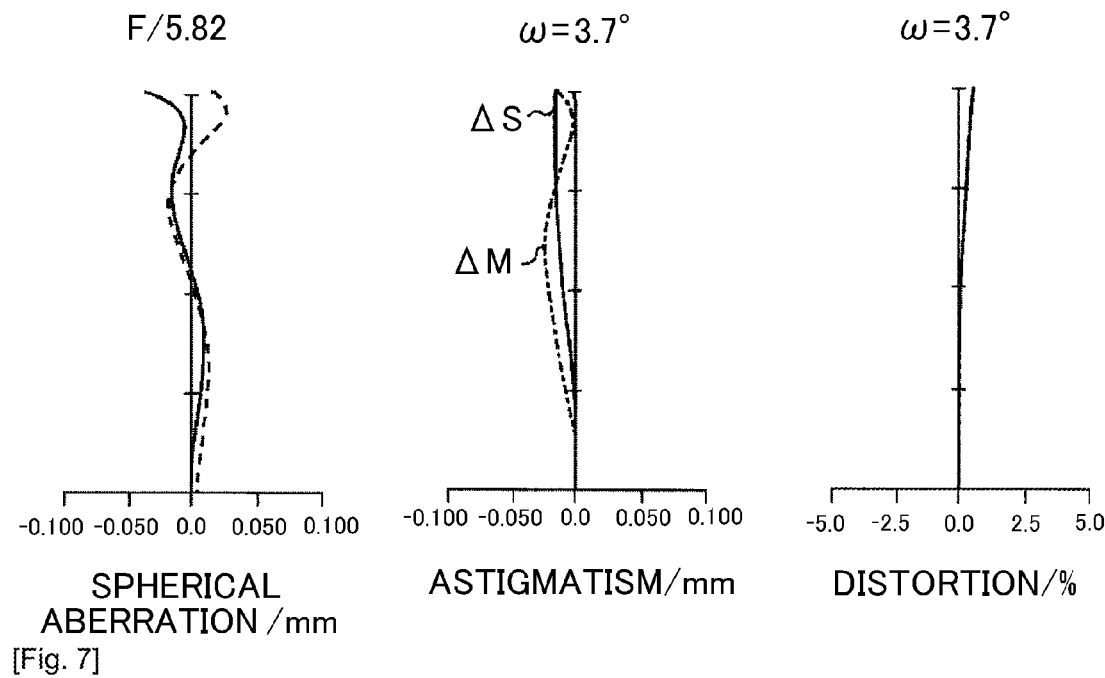
[Fig. 7]
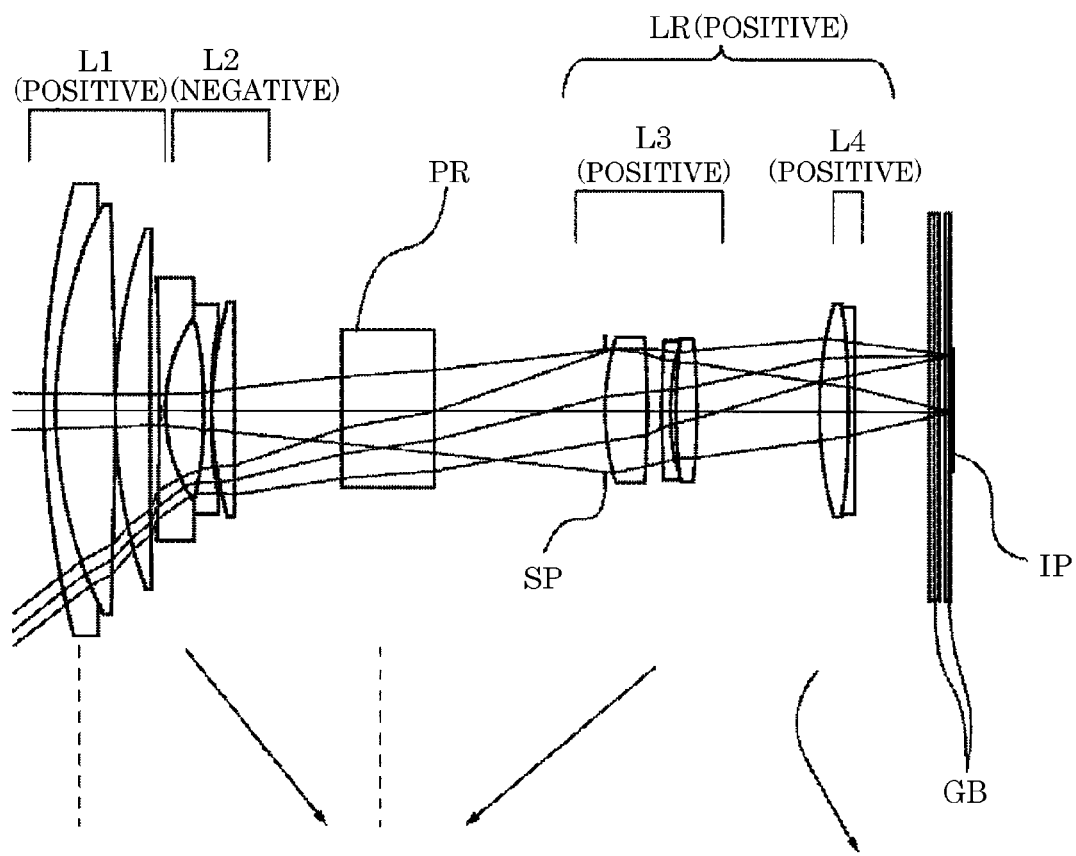

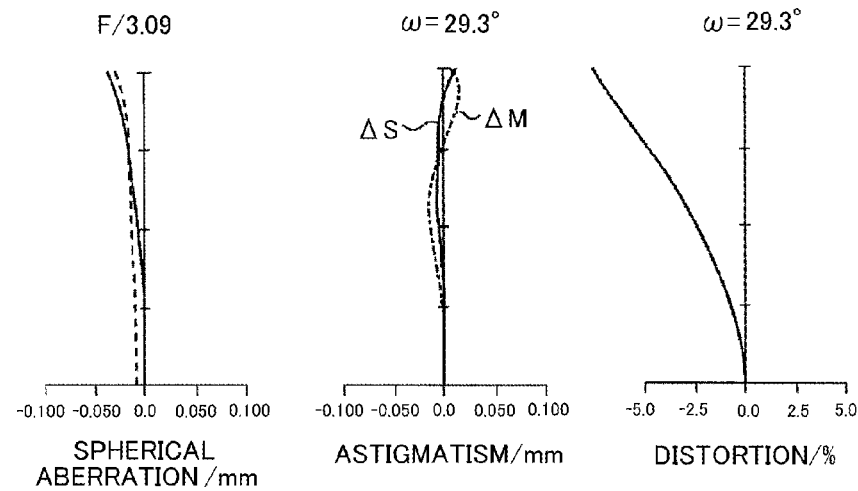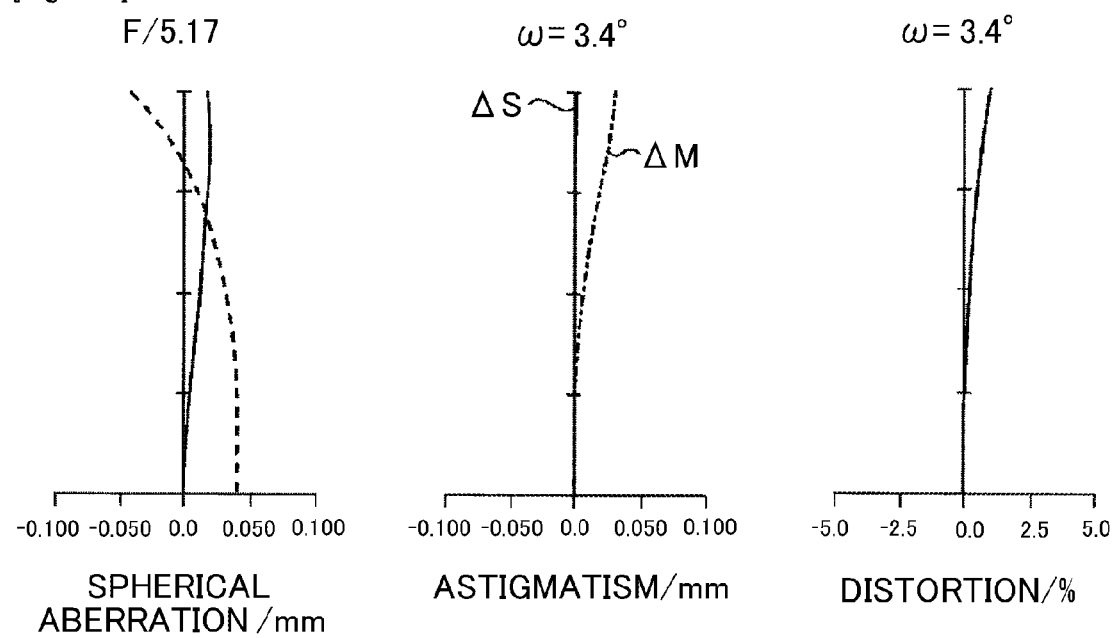

[Fig. 9]
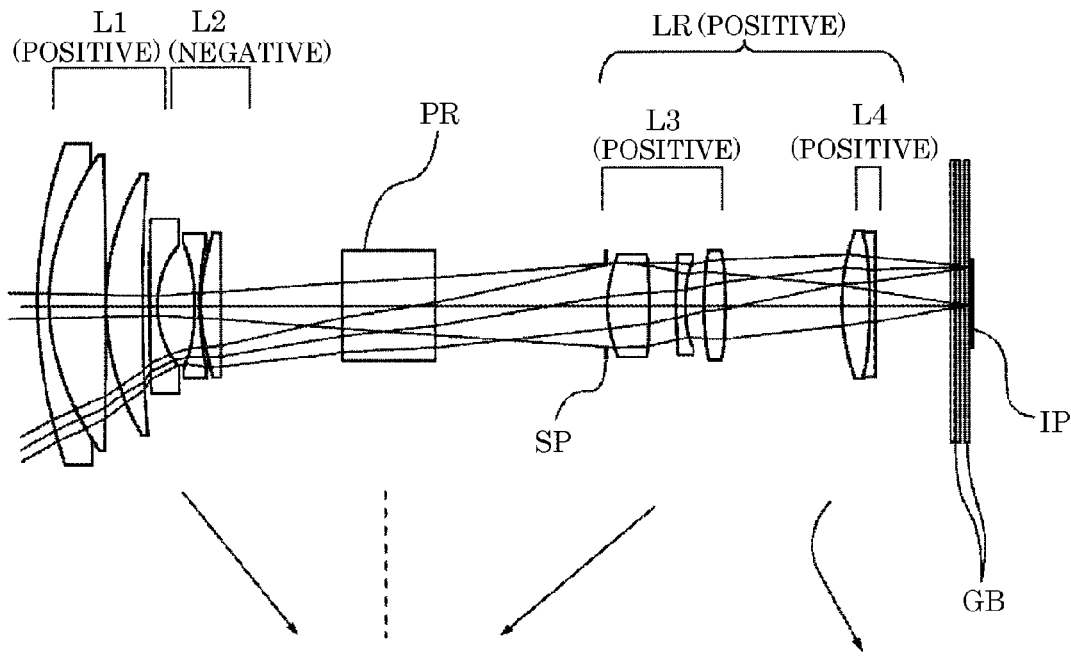
[Fig. 10-A]
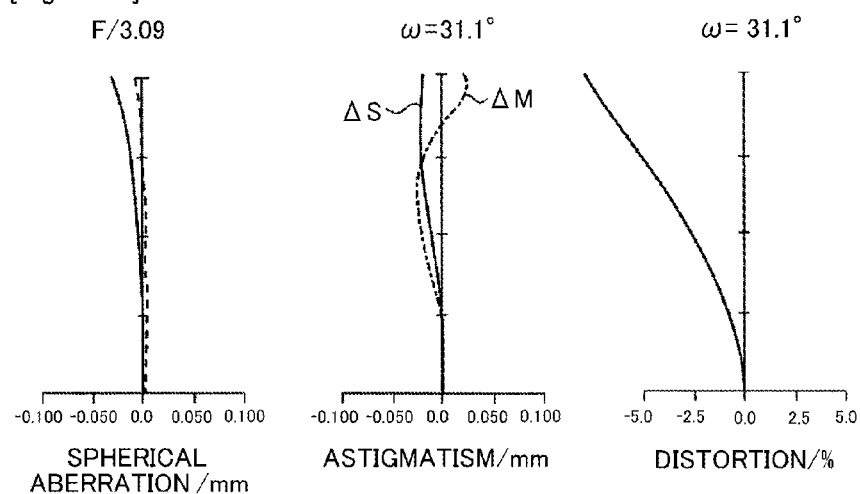
F/3.09  ω=31.1°  ω=31.1°
SPHERICAL ABERRATION /mm    ASTIGMATISM/mm    DISTORTION/%

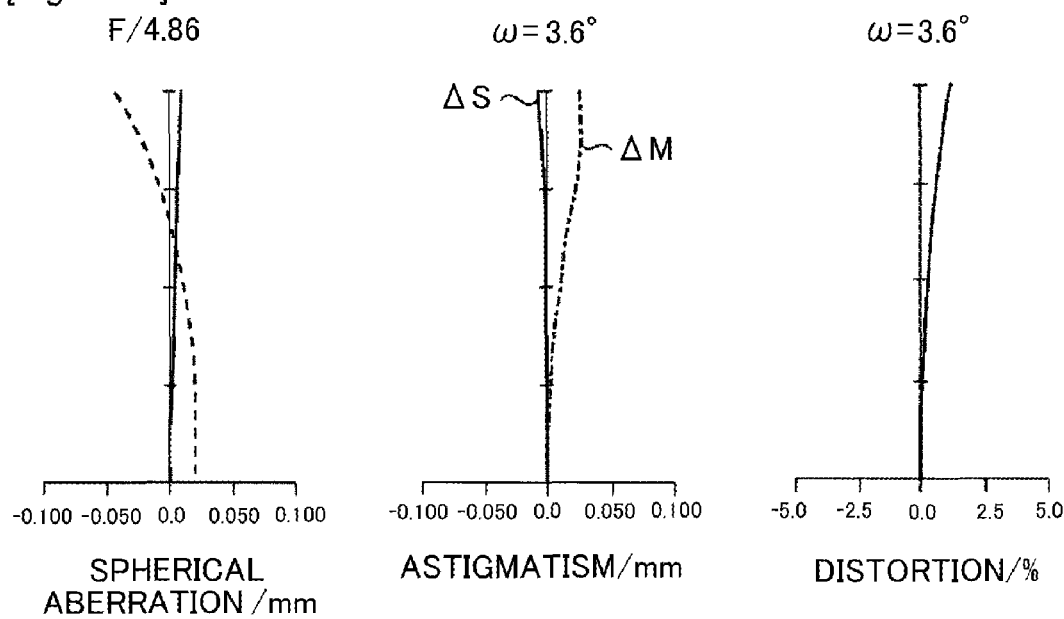
[Fig. 10-B]

[Fig. 11A]
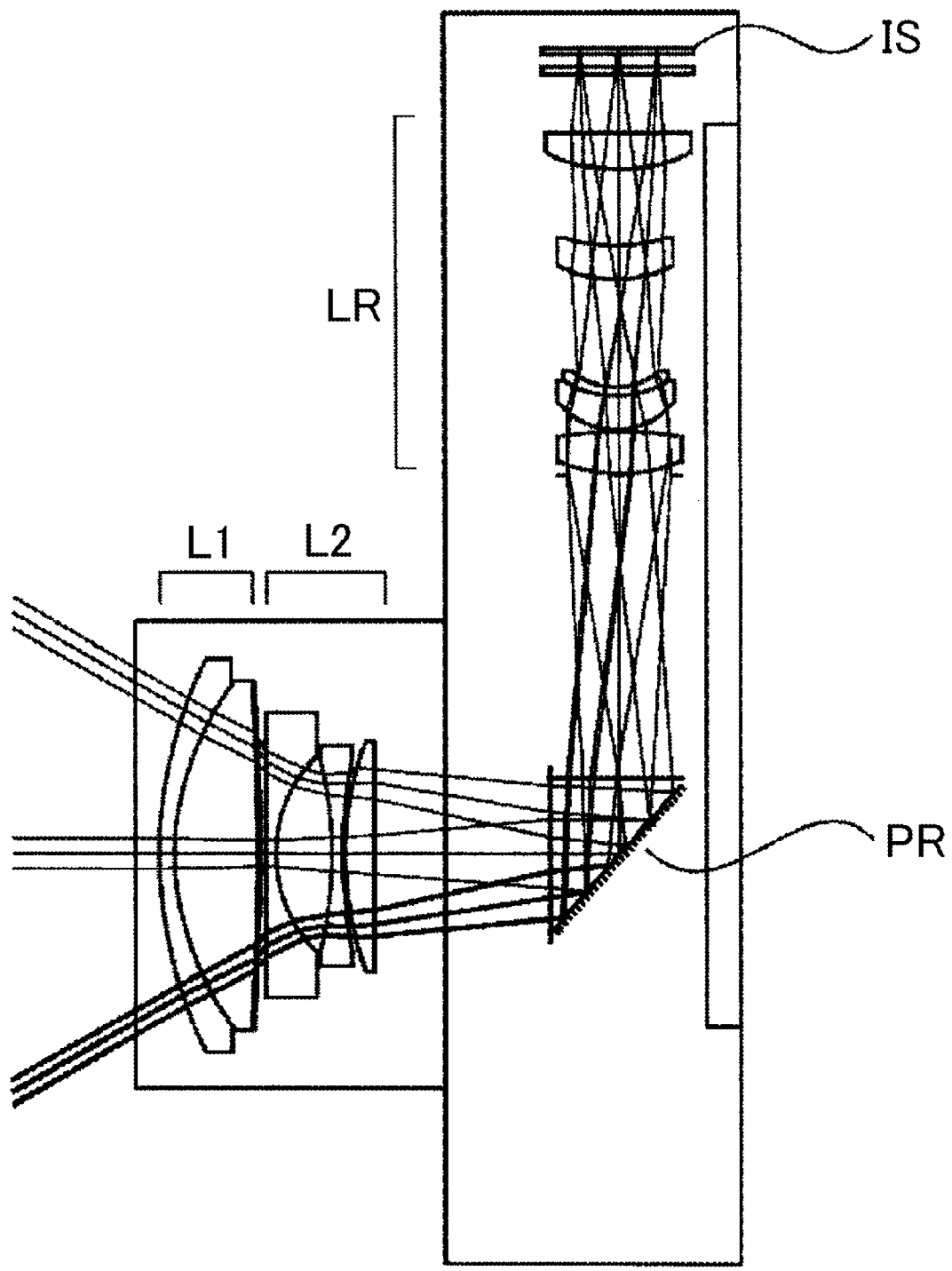

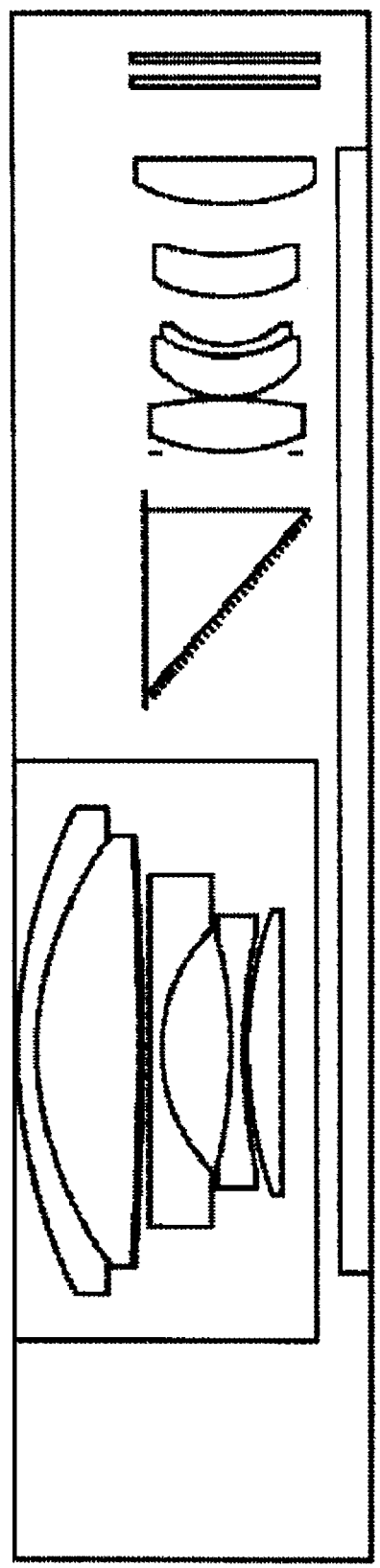
[Fig. 11B]

ZOOM LENS AND CAMERA WITH THE SAME

This application is a U. S. National Phase Application of PCT International Application PCT/JP2009/001798 filed on Apr. 20, 2009 which is based on and claims priority from JP 2008-117297 filed on Apr. 28, 2008 the contents of which is incorporated herein in its entirety by reference.

TECHNICAL FIELD

The present invention relates to a zoom lens suitable for an image pickup optical system used for a camera such as a digital still camera.

BACKGROUND ART

A compact zoom lens having a high zoom ratio is requested for an image pickup optical system with increasing performance of cameras (digital cameras) using a solid-state image pickup element.

In order to decrease the size of the camera and increase the zoom ratio of the zoom lens, a so-called retractable zoom lens is widely used in which lens units are disposed closer to each other in a non-image pickup state than in an image pickup state to be retracted into a camera body.

Moreover, U.S. Pat. No. 6,333,823 and Japanese Patent Laid-Open No. 2004-102090 disclose bent-type zoom lenses in which an optical path thereof is bent by 90° using an optical element such as a prism including a reflective surface to reduce a thickness of a camera (hereinafter referred to as "camera thickness").

Further, U.S. Pat. No. 7,426,085 discloses a zoom lens in which a lens unit disposed closer to an object than a reflective unit such as a prism is retracted into a space formed by movement of the reflective unit. Such a zoom lens, which corresponds to a combination of the retractable zoom lens and the bent-type zoom lens, is hereinafter referred to as "retractable bent-type zoom lens".

Although the retractable bent-type zoom lens is capable of significantly decreasing the camera thickness and significantly increasing the zoom ratio, an optical system thereof should be designed with consideration for a mechanism enabling withdrawal of the reflective unit and movement (retraction) of the lens unit disposed closer to the object than the reflective unit (the lens unit is hereinafter referred to as "object-side lens unit"). However, an optical system disclosed in U.S. Pat. No. 7,426,085 in which a first lens unit disposed closest to the object is moved in a large movable range during zooming is disadvantageous in such a mechanism, so that the optical system does not has a realistic configuration for achieving decrease of the camera thickness and increase of the zoom ratio.

Specifically, in order to enable the withdrawal of the reflective unit and the retraction of the object-side lens unit, it is necessary to form a large opening on a cam barrel which moves the object-side lens unit. Forming such a large opening on the cam barrel reduces a rotatable angle of the cam barrel, which results in reduction of a movable range of the first lens unit to a range enabling only movement thereof from an image pickup state to a retracted state. In order to enable movement of the first lens unit during zooming, as disclosed in U.S. Pat. No. 7,426,085, it is necessary to compromise at least one of requirements of a size (thickness), the zoom ratio and image-forming performance of the zoom lens.

SUMMARY OF INVENTION

The present invention provides a retractable bent-type zoom lens capable of providing a high zoom ratio and a reduced thickness, and capable of retracting into a camera body with an easily-configured mechanism.

The present invention provides as one aspect thereof a zoom lens including in order from an object side to an image side, a first lens unit having a positive refractive power, a second lens unit having a negative refractive power, a prism including a reflective surface which bends an optical path, and a posterior lens group which includes plural lens units and has as a whole a positive refractive power. The first lens unit and the second lens unit are retractable into a space formed by movement of the prism in a direction orthogonal to an optical axis of the first lens unit, and, during zooming, the second lens unit and the plural lens units in the posterior lens group are moved while the first lens unit and the prism are fixed.

BRIEF DESCRIPTION OF DRAWINGS

FIG. 1 is a cross-sectional view of a zoom lens that is Embodiment 1 of the present invention.

FIGS. 2A and 2B show aberration charts of the zoom lens of Embodiment 1.

FIG. 3 is a cross-sectional view of a zoom lens that is Embodiment 2 of the present invention.

FIGS. 4A and 4B show aberration charts of the zoom lens of Embodiment 2.

FIG. 5 is a cross-sectional view of a zoom lens that is Embodiment 3 of the present invention.

FIGS. 6A and 6B show aberration charts of the zoom lens of Embodiment 3.

FIG. 7 is a cross-sectional view of a zoom lens that is Embodiment 4 of the present invention.

FIGS. 8A and 8B show aberration charts of the zoom lens of Embodiment 4.

FIG. 9 is a cross-sectional view of a zoom lens that is Embodiment 5 of the present invention.

FIGS. 10A and 10B show aberration charts of the zoom lens of Embodiment 5.

FIGS. 11A and 11B are schematic views of a digital still camera using the zoom lens of each embodiment.

DESCRIPTION OF EMBODIMENTS

Exemplary embodiments of the present invention will hereinafter be described with reference to the accompanying drawings. Description will be first made of a common outline of zoom lenses of embodiments of the present invention.

FIGS. 11A and 11B are schematic views of a digital still camera using a zoom lens of each of embodiments described below. FIG. 11A shows an image pickup state of the camera, and FIG. 11B shows a retracted state thereof.

In FIGS. 11A and 11B, reference character L1 denotes a first lens unit having a positive refractive power. An optical power is expressed by an inverse of a focal length. Reference character L2 denotes a second lens unit having a negative refractive power. Reference character PR denotes a prism including a reflective surface which bends an optical path. Reference character LR denotes a posterior lens group including plural lens units in which distances therebetween are changed during zooming. The posterior lens group LR has as a whole a positive refractive power. Reference character IS denotes a solid-state image pickup element (photoelectric conversion element) such as a CCD sensor or a CMOS sensor which receives an object image (optical image) formed by the zoom lens.

When the camera is changed from the image pickup state shown in FIG. 11A to the retracted state shown in FIG. 11B, the prism PR is moved in a direction orthogonal to an optical axis of the first lens unit L1, and the first lens unit L1 and the second lens unit L2 are retracted into a space formed by the movement (withdrawal) of the prism PR. Employing such a retractable bent-type zoom lens achieves reduction of a thickness of the camera (hereinafter referred to as "camera thickness").

During zooming, while the first lens unit L1 and the prism PR are fixed (unmoved), the second lens unit L2 and the plural lens units in the posterior lens group LR are moved. Such a configuration enables increase of a zoom ratio by the second lens unit L2 and the posterior lens group LR, which can achieve a high zoom ratio even though the first lens unit L1 is fixed during zooming.

As mentioned above, in order to enable withdrawal of the prism PR and the retraction of the first and second lens units L1 and L2, it is necessary to form on a cam barrel a large opening for the withdrawal of the prism PR. Such an opening makes it difficult to form a cam groove for moving the first lens unit L1 during zooming. Therefore, each of the embodiments moves the second lens unit L2, instead of moving the first lens unit L1. Since the second lens unit L2 is a compact and light lens unit compared with the first lens unit L1, a drive mechanism constituted by a compact driving source such as a stepping motor and a lead screw can be arranged around the second lens unit L2. Thus, even though a drive mechanism constituted by a cam barrel is not employed, the second lens unit L2 can be moved.

Such a configuration enables a retractable bent-type zoom lens with an easily-configured mechanism.

Next, description will be made of preferred conditions for the zoom lens of each of the embodiments.

It is preferable for the zoom lens to satisfy the following condition where f2 represents a focal length of the second lens unit L2, and fw and ft respectively represent focal lengths of the entire zoom lens at a wide-angle end and at a telephoto end:

$$1.5 < |\sqrt{(fw \cdot ft)}/f2| < 5.0 \qquad (1).$$

The conditional expression (1) shows a limitation of a refractive power of the second lens unit L2, the limitation being a preferred condition to reduce the camera thickness. If a value of $|\sqrt{(fw \cdot ft)}/f2|$ falls below the lower limit of the conditional expression (1), the refractive power of the second lens unit L2 is excessively reduced, which increases a movement amount of the second lens unit L2 for securing a desired zoom ratio. This results in disadvantage for reduction of the camera thickness. On the contrary, if the value of $|\sqrt{(fw \cdot ft)}/f2|$ falls exceeds the upper limit of the conditional expression (1), the refractive power of the second lens unit L2 is excessively increased, which increases an edge thickness of a positive lens element included in the second lens unit L2. This results in disadvantage for reduction of a thickness of the second lens unit L2.

It is more preferable for the zoom lens to satisfy the following conditional expression (1a). The satisfaction of the conditional expression (1a) makes it possible to especially reduce the thickness of the second lens unit L2.

$$1.6 < |\sqrt{(fw \cdot ft)}/f2| < 3.5 \qquad (1a)$$

Moreover, it is preferable for the zoom lens to satisfy the following condition where Zr represents a variable magnification ratio of the posterior lens group LR, and Z represents a variable magnification ratio of the entire zoom lens:

$$0.2 < Zr/Z < 0.8 \qquad (2).$$

The variable magnification ratio Zr of the posterior lens group LR means a ratio of a focal length of the posterior lens group LR at a telephoto end to a focal length thereof at a wide-angle end. The variable magnification ratio of the entire zoom lens means a ratio of a focal length of the entire zoom lens at the telephoto end to a focal length thereof at the wide-angle end, which corresponds to a zoom ratio.

The conditional expression (2) shows a limitation of a magnification varying burden allotted to the posterior lens group LR, the limitation being a condition for securing a desired zoom ratio without extremely increasing the refractive power of the second lens unit L2. If a value of Zr/Z falls below the lower limit of the conditional expression (2), the magnification varying burden of the posterior lens group LR is increased, thereby increasing a movement amount of the second lens unit L2 during zooming or increasing the thickness of the second lens unit L2. This results in disadvantage for reduction of the camera thickness. On the contrary, if the value of Zr/Z exceeds the upper limit of the conditional expression (2), the magnification varying burden of the posterior lens group LR is excessively increased, which increases variations of aberrations such as spherical aberration during zooming.

It is more preferable for the zoom lens to satisfy the following conditional expression (2a). The satisfaction of the conditional expression (2a) makes it possible to achieve a thin and compact zoom lens with less aberration variation during zooming.

$$0.2 < Zr/Z < 0.5 \qquad (2a)$$

Further, it is preferable for the zoom lens to satisfy the following condition where N2max represents a refractive index for a d-line (wavelength: 587.6 nm) of a material forming a negative lens element having a maximum refractive power among negative lens elements included in the second lens unit L2:

$$1.84 < N2max < 2.40 \qquad (3).$$

The conditional expression (3) shows a limitation of a refractive index of the negative lens element having the maximum refractive power (hereinafter referred to as "maximum negative lens element") among the negative lens elements included in the second lens unit L2, the limitation being a preferred condition for achieving both reduction of the thickness of the second lens unit L2 and correction of chromatic aberration of magnification. If a value of N2max falls below the lower limit of the conditional expression (3), the refractive index of the maximum negative lens element is excessively reduced, which increases an edge thickness of the maximum negative lens element in order to obtain a desired refractive power thereof. This results in disadvantage for reduction of the thickness of the second lens unit L2. On the contrary, if the value of N2max exceeds the upper limit of the conditional expression (3), since a glass material having such a refractive index (N2max) generally has a high dispersion characteristic, it is not preferable for correcting the chromatic aberration of magnification generated at the wide-angle end or the like.

It is more preferable that a material satisfying the following conditional expression (3a) be selected. The satisfaction of the conditional expression (3a) can achieve a thin zoom lens with less color blur.

$$1.84 < N2max < 2.30 \qquad (3a)$$

Furthermore, it is preferable for the zoom lens to satisfy the following condition where f1 represents a focal length of the first lens unit L1:

$$0.4 < \sqrt{(fw \cdot ft)}/f1 < 1.2 \qquad (4)$$

The conditional expression (4) shows a limitation for the refractive power of the first lens unit L1 which is preferable to reduce the camera thickness. If the refractive power of the first lens unit L1 is reduced such that a value of $\sqrt{(fw \cdot ft)}/f1$ falls below the lower limit of the conditional expression (4), it is necessary to increase a movement amount of the second lens unit L2 during zooming in order to secure a desired zoom ratio. This results in disadvantage for reduction of the camera thickness. On the contrary, if the value of $\sqrt{(fw \cdot ft)}/f1$ exceeds the upper limit of the conditional expression (4), it is necessary to increase a thickness of a central part of a positive lens element included in the first lens unit L1. This also results in disadvantage for reduction of a thickness of the first lens unit L1.

It is more preferable to configure the first lens unit L1 such that the following conditional expression (4a) be satisfied. The satisfaction of the conditional expression (4a) makes it possible to further reduce the thickness of the first lens unit L1.

$$0.4 < \sqrt{(fw \cdot ft)}/f1 < 1.0 \qquad (4a)$$

Moreover, it is preferable for the zoom lens, when the second lens unit L2 includes only one positive lens element, to satisfy the following conditions where N2p and ν2p respectively represent a refractive index for the d-line of a material forming the one positive lens element and an Abbe constant of the material:

$$1.84 < N2p \qquad (5)$$

$$5 < \nu 2p < 24 \qquad (6)$$

The conditional expressions (5) and (6) show limitations of the refractive index and the Abbe constant of the only one positive lens element included in the second lens unit L2, the limitations being preferred conditions for achieving both reduction of the thickness of the second lens unit L2 and correction of chromatic aberration of magnification.

If a value of N2p falls below the lower limit of the conditional expression (5), it is necessary to increase a thickness of a central part of the positive lens element in order to secure a desired refractive power. This results in disadvantage for reduction of the thickness of the second lens unit L2.

If a value of ν2p falls below the lower limit of the conditional expression (6), it is difficult to correct the chromatic aberration of magnification generated in a wide angle region. On the contrary, if a glass material is employed whose value of ν2p exceeds the upper limit of the conditional expression (6), it is necessary to select a low refractive index glass material for a negative lens element included in the second lens unit L2, which is disadvantageous for reduction of the thickness of the second lens unit L2.

It is more preferable to select a material satisfying the following conditional expressions (5a) and (6a). Employing such a material for the one positive lens element in the second lens unit L2 makes it possible to reduce color blur and the thickness of the second lens unit L2.

$$1.84 < N2p < 2.30 \qquad (5a)$$

$$13 < \nu 2p < 22 \qquad (6a)$$

Moreover, it is preferable for the zoom lens to satisfy the following condition where T1 and T2 respectively represent the thicknesses of the first lens unit L1 and the second lens unit L2 on the optical axis, and fw and ft respectively represent focal lengths of the entire zoom lens at the wide-angle end and at the telephoto end:

$$0.4 < (T1+T2)/\sqrt{(fw \cdot ft)} < 1.3 \qquad (7).$$

The "thicknesses of the lens unit on the optical axis" means a distance from a lens surface closest to the object to a lens surface closest to the image on the optical axis in the lens unit.

The conditional expression (7) shows a preferred condition for well balancing reduction of the camera thickness and optical performance of the zoom lens. If a sum of the thicknesses of the first and second lens units L1 and L2 is reduced such that a value of $(T1+T2)/\sqrt{(fw \cdot ft)}$ falls below the lower limit of the conditional expression (7), difficulties are caused in settings of the number of constituent lens elements and refractive index arrangement of the zoom lens. This results in a difficulty in securing a required aberration correction performance. On the contrary, if the value of $(T1+T2)/\sqrt{(fw \cdot ft)}$ exceeds the upper limit of the conditional expression (7), it becomes difficult to reduce the camera thickness.

It is more preferable for the zoom lens to satisfy the following conditional expression (7a). The satisfaction of the conditional expression (7a) makes it possible to secure good aberration correction performance and achieve a thin zoom lens.

$$0.7 < (T1+T2)/\sqrt{(fw \cdot ft)} < 1.1 \qquad (7a)$$

Further, it is preferable for the zoom lens to have at least one aspheric surface in the second lens unit L2. This makes it possible to suppress generation of aberration due to a lens shape providing a large refractive power, thereby enabling reduction of the number of constituent lens elements. This results in reduction of the camera thickness.

Moreover, it is preferable for the zoom lens to all the lens units other than the first lens unit L1 and the prism PR are moved during zooming from the wide-angle end to the telephoto end. This makes it possible to achieve a high zoom ratio with a compact configuration.

In addition, when the camera is changed from the image pickup state to the retracted state, the movement (withdrawal) of the prism PR in a direction along the optical axis of the first lens unit L1 increases the camera thickness. Therefore, it is preferable that the prism PR be moved in a direction orthogonal to the optical axis of the first and second lens units L1 and L2 (that is, in a direction along an optical axis of the posterior lens group LR). In particular, if the prism PR can be moved toward the image, it becomes possible to effectively use spaces in width and height directions of the camera, which enables a more compact design of the camera.

However, there may be a case where a space which is closer to the image than the prism PR and into which the prism PR is withdrawn cannot be secured for reasons such as a short movement amount of each of the lens units constituting the posterior lens group LR. In such a case, the prism PR may be moved in the direction along the optical axis of the posterior lens group LR but in a direction opposite to the image. Alternatively, the prism PR may be moved in a direction orthogonal or oblique to a plane including the optical axis before and after being bent (shown in FIGS. 11A and 11B).

Next, specific description will be made of the embodiments of the zoom lens of the present invention using the drawings.

FIG. 1 shows a cross section of the zoom lens of a first embodiment (Embodiment 1) at the wide-angle end. FIGS. 2A and 2B respectively show longitudinal aberrations of the zoom lens of Embodiment 1 at the wide-angle end and at the telephoto end.

FIG. 3 shows a cross section of the zoom lens of a second embodiment (Embodiment 2) at the wide-angle end. FIGS. 4A and 4B respectively show longitudinal aberrations of the zoom lens of Embodiment 2 at the wide-angle end and at the telephoto end.

FIG. 5 shows a cross section of the zoom lens of a third embodiment (Embodiment 3) at the wide-angle end. FIGS. 6A and 6B respectively show longitudinal aberrations of the zoom lens of Embodiment 3 at the wide-angle end and at the telephoto end.

FIG. 7 shows a cross section of the zoom lens of a fourth embodiment (Embodiment 4) at the wide-angle end. FIGS. 8A and 8B respectively show longitudinal aberrations of the zoom lens of Embodiment 4 at the wide-angle end and at the telephoto end.

FIG. 9 shows a cross section of the zoom lens of a fifth embodiment (Embodiment 5) at the wide-angle end. FIGS. 10A and 10B respectively show longitudinal aberrations of the zoom lens of Embodiment 5 at the wide-angle end and at the telephoto end.

Embodiments 1 to 5 respectively correspond to Numeric Examples 1 to 5 described later.

In each of the cross-sectional views of FIGS. 1, 3, 5, 7 and 9, reference character L1 denotes the above-described first lens unit having a positive refractive power, and reference character L2 denotes the above-described second lens unit having a negative refractive power. Reference character PR denotes the above-described prism which bends an optical path. Reference character LR denotes the above-described posterior lens group constituted by plural lens units.

Reference character L3 denotes a third lens unit having a positive refractive power, reference character L4 denotes a fourth lens unit having a positive refractive power, and reference character L5 denotes a fifth lens unit having a positive refractive power. In Embodiments 1 and 3 (shown in FIGS. 1 and 5), the posterior lens group LR is constituted by the third to fifth lens units L3 to L5. In Embodiments 2, 4 and 5 (shown in FIGS. 3, 7 and 9), the posterior lens group LR is constituted by the third and fourth lens units L3 and L4.

In each of the cross-sectional views, "(positive)" or "(negative)" in "L1 (positive)" or the like denotes a sign of the refractive power of the lens unit. Further, the left side in each of the cross-sectional views corresponds to an object side (front side), and the right side therein corresponds to an image side (rear side). The first lens unit L1, the second lens unit L2, the prism PR and the posterior lens unit LR are arranged in order from the object side to the image side.

Reference character SP denotes an aperture stop. Reference character GB denotes a glass block provided in design, which corresponds to an optical filter, a face plate of an image pickup element, or the like. The glass block GB is constituted by plural parallel plates.

Reference character IP denotes an image plane. The image plane IP corresponds to, when the zoom lens of each embodiment is used as an image pickup optical system of a digital still camera, an image pickup plane of a solid-state image pickup element (photoelectric conversion element) such as a CCD sensor or a CMOS sensor. The image plane IP corresponds to, when the zoom lens of each embodiment is used as an image pickup optical system of a film camera, a surface of a silver-halide film.

Each of the aberration charts shown in FIGS. 2, 4, 6, 8 and 10 shows spherical aberration, astigmatism and distortion of the zoom lens of each embodiment. In the chart showing the spherical aberration, a vertical axis shows an F-number (Fno). A solid line d shows the aberrations for the d-line, and a dotted line g shows the aberrations for a g-line. Vertical axes in the charts of the astigmatism and the distortion show a half-field angle ($\omega$). A dashed-dotted line $\Delta M$ in the chart of the astigmatism shows astigmatism in a meridional image surface, and a solid line $\Delta S$ therein shows astigmatism in a sagittal image surface. The distortion is shown for the d-line.

Arrows in each cross-sectional view of the zoom lens show movement loci of the lens units during zooming from the wide-angle end to the telephoto end, each movement locus being formed by plotting positions of each lens unit at respective zoom positions.

In the zoom lenses of Embodiments 1 to 5, all the lens units other than the first lens unit L1 are moved along the optical axis during zooming. The first lens unit L1 and the prism PR are not moved, that is, are fixed (unmoved) for zooming. Moving all the lens units other than the first lens unit L1 as described above secures a desired zoom ratio while suppressing increase in size of the zoom lens. The "wide-angle end" and the "telephoto end" mean zoom positions at which a magnification-varying (zooming) lens unit reaches both ends of its mechanically movable range along the optical axis.

In Embodiments 1 and 3, variation of magnification for zooming from the wide-angle end to the telephoto end is performed by moving the second lens unit L2 to the image side, moving the third lens unit L3 to the object side monotonically and moving the fifth lens unit L5 to the image side. An image plane variation associated with the variation of magnification is corrected by moving the fourth lens unit L4 to the object side along a locus convex toward the image side. In Embodiments 1 and 3, the movement of three lens units that are the second, third and fifth lens units L2, L3 and L5 increases a variable magnification ratio to obtain a high zoom ratio often times without moving the first lens unit L1. Focusing is performed by moving the fifth lens unit L5.

On the other hand, in Embodiments 2, 4 and 5, the variation of magnification for zooming from the wide-angle end to the telephoto end is performed by moving the second lens unit L2 to the image side monotonically and moving the third lens unit L3 to the object side. The image plane variation associated with the variation of magnification is corrected by moving the fourth lens unit L4 along a locus convex toward the object side.

In Embodiments 2, 4 and 5, the movement of two lens units that are the second and third lens units L2 and L3 increases a variable magnification ratio to obtain a high zoom ratio of ten times without moving the first lens unit L1. Focusing is performed by moving the fourth lens unit L4.

In each of Embodiments 1 to 5, during zooming from the wide-angle end to the telephoto end, although the second lens unit L2 is monotonically moved to the image side, the second lens unit L2 may be moved to the image side along a locus convex toward the image side.

Further, in each of Embodiments 1 to 5, the refractive power of the second lens unit L2 is set so as to satisfy the conditional expression (1) in order to reduce a movement amount (stroke) of the second lens unit L2 during zooming, the movement amount influencing the camera thickness. Additionally, a magnification varying burden of the posterior lens group LR is adequately set so as to satisfy conditional expression (2) in order to reduce that of the second lens unit L2. A synergistic effect thereof reduces the movement amount of the second lens unit L2 to achieve a high zoom ratio and reduction of the camera thickness.

Moreover, in order to realize reduction of the thickness of the second lens unit L2 and give a large refractive power thereto, the second lens unit L2 includes a negative lens element satisfying the conditional expression (3). Furthermore, an aspheric surface is provided on any of lens surfaces in the second lens unit L2 for achieving good aberration correction.

Further, the refractive power of the first lens unit L1 is set so as to satisfy the conditional expression (4) to reduce the camera thickness.

Moreover, the second lens unit L2 includes a positive lens element satisfying the conditional expressions (5) and (6) to reduce the thickness of the second lend unit L2 and correct chromatic aberration of magnification well.

In addition, the thicknesses of the first and second lens units L1 and L2 are adequately set so as to satisfy the conditional expression (7) to well balance reduction of the camera thickness and optical performance.

In the zoom lens of each of Embodiments 1 to 5, the aperture stop SP may be controlled according to the zoom position in order to reduce variations of an F-number during zooming. In a digital camera, the distortion optically remaining may be electrically corrected by image processing.

Next, Numerical examples 1 to 5 respectively corresponding to Embodiments 1 to 5 will be shown.

In each Numerical Example, r denotes a curvature radius (mm), and d denotes a distance (mm) between surfaces adjacent to each other. Nd denotes a refractive index of a material for the d-line. νd denotes an Abbe constant of the material with reference to the d-line, the Abbe constant being expressed by the following expression:

$$\nu d = (Nd-1)/(NF-NC)$$

where Nd represents a refractive index for the d-line whose wavelength is 587.6 nm, NF represents a refractive index for an F-line whose wavelength is 486.1 nm, and NC represents a refractive index for a C-line whose wavelength is 656.3 nm.

An aspheric surface is shown by adding "*" to a surface number thereof. An aspheric surface shape is defined by the following expression where x represents a displacement amount with respect to an apex of the surface in a direction of an optical axis at a height position of h from the optical axis:

$$X = (h^2/R)/[1+\{1-(1+k)(h/R)^2\}^{1/2}] + A4h^4 + A6h^6 + A8h^8 + A10h^{10}.$$

In the above expression, K represents a conic constant, A4, A6, A8 and A10 represent aspheric surface coefficients in each term, and R represents a paraxial curvature radius. "e±YYY" means "×10$^{\pm YYY}$"

Table 1 shows relationships between the above-described conditional expressions and numerical values in Numerical Examples.

NUMERICAL EXAMPLE 1

Unit: mm
Surface Data

| SURFECE NO. | r | d | nd | vd | EFFECTIVE DIAMETER |
|---|---|---|---|---|---|
| 1 | 26.260 | 1.20 | 1.84666 | 23.8 | 24.50 |
| 2 | 17.076 | 6.16 | 1.71300 | 53.9 | 21.97 |
| 3 | −110.388 | 0.05 | | | 20.72 |
| 4* | −129.136 | (variable) | | | 20.56 |
| 5 | −241.176 | 0.80 | 1.88300 | 40.8 | 16.88 |
| 6 | 8.463 | 4.01 | | | 12.87 |
| 7* | −27.740 | 1.00 | 1.77250 | 49.6 | 12.83 |
| 8* | 33.741 | 0.10 | | | 13.10 |
| 9 | 18.823 | 2.16 | 1.92286 | 18.9 | 13.47 |
| 10 | 609.614 | (variable) | | | 13.35 |
| 11 | ∞ | 10.00 | 1.80610 | 33.3 | 10.33 |
| 12 | ∞ | (variable) | | | 9.09 |
| 13(stop) | ∞ | 0.10 | | | 7.89 |
| 14* | 11.307 | 2.76 | 1.48749 | 70.2 | 8.02 |
| 15 | −26.618 | 0.10 | | | 7.92 |
| 16 | 5.806 | 2.24 | 1.48749 | 70.2 | 7.50 |
| 17 | 8.344 | 0.60 | 2.00330 | 28.3 | 6.60 |
| 18 | 5.009 | (variable) | | | 6.01 |

-continued

| SURFECE NO. | r | d | nd | vd | EFFECTIVE DIAMETER |
|---|---|---|---|---|---|
| 19 | 12.483 | 2.11 | 1.48749 | 70.2 | 7.44 |
| 20 | 15.020 | (variable) | | | 7.32 |
| 21* | 14.093 | 2.24 | 1.48749 | 70.2 | 9.62 |
| 22 | 147.405 | (variable) | | | 9.39 |
| 23 | ∞ | 0.60 | 1.51633 | 64.1 | 20.00 |
| 24 | ∞ | 0.80 | | | 20.00 |
| 25 | ∞ | 0.40 | 1.51633 | 64.1 | 20.00 |
| 26 | ∞ | | | | |

Aspheric Surface Data

Surface 4
  K=0.00000e+000 A4=8.82697e−006 A6=−1.32866e−008 A8=3.12115e−011 A10=−1.19317e−013

Surface 7
  K=0.00000e+000 A4=−4.62831e−005 A6=2.61047e−006 A8=−4.58184e−008 A10=3.33447e−010

Surface 8
  K=−2.32869e+001 A4=8.79015e−006 A6=1.71875e−006 A8=−3.59218e−008 A10=1.97760e−010

Surface 14
  K=1.40846e+000 A4=−2.62257e−004 A6=−1.86738e−006 A8=−4.60681e−008

Surface 21
  K=−6.87614e−002 A4=−2.36316e−005 A6=6.96931e−006 A8=−3.51626e−007 A10=6.56012e−009

Zoom Lens Data

Zoom Ratio 9.58

| | wide-angle end | middle | telephoto end |
|---|---|---|---|
| Focal Length | 6.21 | 14.36 | 59.47 |
| F-number | 2.99 | 4.00 | 5.90 |
| Field Angle | 32.00 | 15.10 | 3.70 |
| Image Height | 3.95 | 3.88 | 3.88 |
| Entire Lens Length | 86.94 | 86.81 | 87.02 |
| BF | 0.01 | 0.01 | 0.01 |
| d4 | 0.53 | 6.06 | 13.49 |
| d10 | 13.40 | 7.79 | 0.55 |
| d12 | 19.88 | 12.13 | 0.55 |
| d18 | 6.99 | 12.52 | 1.17 |
| d20 | 4.92 | 9.03 | 31.59 |
| d22 | 3.77 | 1.84 | 2.22 |
| Entrance Pupil Position | 19.64 | 35.60 | 71.22 |
| Exit Pupil Position | −37.93 | −149.36 | 244.27 |
| Front Principal Point | 24.83 | 48.58 | 145.18 |
| Rear Principal Point | −6.19 | −14.35 | −59.46 |

Lens Unit Data

| Lens Unit | Most-Object Side Surface | Focal Length | Lens Unit Length | Front Principal Point | Rear Principal Point |
|---|---|---|---|---|---|
| 1 | 1 | 33.76 | 7.41 | 0.65 | −3.72 |
| 2 | 5 | −9.09 | 8.07 | 0.35 | −5.98 |
| | 11 | ∞ | 10.00 | 2.77 | −2.77 |
| 3 | 13 | 20.19 | 5.81 | −5.48 | −6.99 |
| 4 | 19 | 119.09 | 2.11 | −5.49 | −6.61 |
| 5 | 21 | 31.79 | 2.24 | −0.16 | −1.65 |
| | 23 | ∞ | 1.80 | 0.73 | −0.73 |

Lens Element Data

| Lens Element | Most-Object Side Surface | Focal Length |
|---|---|---|
| 1 | 1 | −61.34 |
| 2 | 2 | 21.17 |
| 3 | 3 | −1269.49 |
| 4 | 5 | −9.25 |
| 5 | 7 | −19.57 |
| 6 | 9 | 21.01 |
| 7 | 11 | 0.00 |
| 8 | 14 | 16.68 |
| 9 | 16 | 30.36 |
| 10 | 17 | −13.73 |
| 11 | 19 | 119.09 |
| 12 | 21 | 31.79 |
| 13 | 23 | 0.00 |
| 14 | 25 | 0.00 |

NUMERICAL EXAMPLE 2

Unit: mm

Surface Data

| SURFECE NO. | r | d | nd | vd | EFFECTIVE DIAMETER |
|---|---|---|---|---|---|
| 1 | 34.609 | 1.20 | 1.84666 | 23.8 | 26.00 |
| 2 | 18.687 | 5.16 | 1.59240 | 68.3 | 23.30 |
| 3 | 3414.890 | 0.05 | | | 22.58 |
| 4 | 19.840 | 3.20 | 1.77250 | 49.6 | 20.37 |
| 5 | 101.248 | (variable) | | | 19.76 |
| 6 | −243.064 | 0.70 | 1.88300 | 40.8 | 14.15 |
| 7 | 7.397 | 3.42 | | | 10.79 |
| 8* | −17.791 | 0.70 | 1.77250 | 49.6 | 10.69 |
| 9 | 25.431 | 0.05 | | | 10.80 |
| 10 | 16.268 | 2.04 | 1.92286 | 18.9 | 11.00 |
| 11 | −258.652 | (variable) | | | 10.87 |
| 12 | ∞ | 8.50 | 1.83400 | 37.2 | 8.19 |
| 13 | ∞ | (variable) | | | 7.09 |
| 14(stop) | ∞ | 0.00 | | | 7.24 |
| 15* | 10.373 | 3.76 | 1.69350 | 53.2 | 7.51 |
| 16* | −86.327 | 1.74 | | | 7.38 |
| 17 | 50.499 | 0.70 | 1.76182 | 26.5 | 7.16 |
| 18 | 9.010 | 0.52 | | | 7.00 |
| 19 | 31.821 | 1.77 | 1.61272 | 58.7 | 7.01 |
| 20 | −35.124 | (variable) | | | 7.32 |
| 21* | 16.819 | 2.56 | 1.69680 | 55.5 | 10.99 |
| 22 | −32.496 | 0.60 | 1.84666 | 23.8 | 10.79 |
| 23 | −725.734 | (variable) | | | 10.65 |
| 24 | ∞ | 0.31 | 1.54427 | 70.6 | 20.94 |
| 25 | ∞ | 0.50 | 1.49400 | 75.0 | 20.94 |
| 26 | ∞ | 0.40 | | | 20.94 |
| 27 | ∞ | 0.50 | 1.49831 | 65.1 | 20.94 |
| 28 | ∞ | | | | |

Aspheric Surface Data

Surface 8

K=−7.21881e−001 A4=1.01923e−005 A6=1.60897e−006 A8=−6.61072e−008 A10=1.24904e−009

Surface 15

K=−3.63771e−001 A4=−5.74951e−005 A6=−4.44172e−007 A8=−1.35331e−008

Surface 16

K=0.00000e+000 A4=−3.49402e−006 A6=−4.40871e−007 A8=−1.94332e−008

Surface 21

K=3.68775e−001 A4=1.59968e−005 A6=−1.20300e−007 A8=2.86299e−009 A10=−3.14804e−012

Zoom Lens Data

Zoom Ratio 9.54

| | wide-angle end | middle | telephoto end |
|---|---|---|---|
| Focal Length | 6.90 | 21.71 | 65.89 |
| F-number | 3.09 | 3.83 | 5.18 |
| Field Angle | 29.30 | 10.10 | 3.40 |
| Image Height | 3.95 | 3.88 | 3.88 |
| Entire Lens Length | 83.21 | 83.15 | 83.25 |
| BF | 0.14 | 0.15 | 0.13 |
| d5 | 0.94 | 6.59 | 10.48 |
| d11 | 9.73 | 4.08 | 0.30 |
| d13 | 15.65 | 5.24 | 0.50 |
| d20 | 11.29 | 19.16 | 30.98 |
| d23 | 7.06 | 9.55 | 2.48 |
| Entrance Pupil Position | 22.00 | 46.97 | 82.27 |
| Exit Pupil Position | −58.47 | −492.40 | 86.03 |
| Front Principal Point | 28.09 | 67.72 | 198.70 |
| Rear Principal Point | −6.76 | −21.56 | −65.75 |

Lens Unit Data

| Lens Unit | Most-Object Side Surface | Focal Length | Lens Unit Length | Front Principal Point | Rear Principal Point |
|---|---|---|---|---|---|
| 1 | 1 | 24.25 | 9.61 | 2.50 | −3.36 |
| 2 | 6 | −7.20 | 6.91 | 0.54 | −4.76 |
| | 12 | ∞ | 8.50 | 2.32 | −2.32 |
| 3 | 14 | 19.86 | 8.49 | −1.61 | −7.30 |
| 4 | 21 | 26.19 | 3.16 | −0.13 | −1.95 |
| | 24 | ∞ | 1.71 | 0.63 | −0.63 |

Lens Element Data

| Lens Element | Most-Object Side Surface | Focal Length |
|---|---|---|
| 1 | 1 | −49.69 |
| 2 | 2 | 31.70 |
| 3 | 4 | 31.40 |
| 4 | 6 | −8.12 |
| 5 | 8 | −13.46 |
| 6 | 10 | 16.64 |
| 7 | 12 | 0.00 |
| 8 | 15 | 13.57 |
| 9 | 17 | −14.50 |
| 10 | 19 | 27.52 |
| 11 | 21 | 16.25 |
| 12 | 22 | −40.20 |
| 13 | 24 | 0.00 |
| 14 | 25 | 0.00 |
| 15 | 27 | 0.00 |

NUMERICAL EXAMPLE 3

Unit: mm
Surface Data

| SURFECE NO. | r | d | nd | vd | EFFECTIVE DIAMETER |
|---|---|---|---|---|---|
| 1 | 29.194 | 1.20 | 1.84666 | 23.8 | 29.90 |
| 2 | 17.270 | 0.80 | | | 27.13 |
| 3 | 19.050 | 6.74 | 1.77250 | 49.6 | 27.18 |
| 4 | 381.695 | (variable) | | | 26.39 |
| 5 | 100.421 | 0.90 | 1.85961 | 40.3 | 17.44 |
| 6* | 8.522 | 4.68 | | | 13.28 |
| 7* | −17.076 | 1.35 | 1.88300 | 40.8 | 13.20 |
| 8* | 272.246 | 0.11 | | | 13.66 |
| 9 | 27.596 | 2.18 | 1.92286 | 18.9 | 14.07 |
| 10 | −76.512 | (variable) | | | 14.05 |
| 11 | ∞ | 9.50 | 1.77250 | 49.6 | 10.52 |
| 12 | ∞ | (variable) | | | 9.75 |
| 13(stop) | ∞ | 0.10 | | | 8.08 |
| 14* | 11.010 | 2.07 | 1.48749 | 70.2 | 8.32 |
| 15 | −28.833 | 0.10 | | | 8.26 |
| 16 | 5.680 | 2.11 | 1.51633 | 64.1 | 7.82 |
| 17 | 8.308 | 0.60 | 2.00330 | 28.3 | 6.88 |
| 18 | 4.875 | (variable) | | | 6.15 |
| 19 | 13.561 | 2.08 | 1.48749 | 70.2 | 6.17 |
| 20 | 17.409 | (variable) | | | 6.14 |
| 21* | 15.871 | 2.03 | 1.48749 | 70.2 | 8.74 |
| 22 | 226.036 | (variable) | | | 8.58 |
| 23 | ∞ | 0.60 | 1.51633 | 64.1 | 20.00 |
| 24 | ∞ | 0.90 | | | 20.00 |
| 25 | ∞ | 0.40 | 1.51633 | 64.1 | 20.00 |
| 26 | ∞ | | | | |

Aspheric Surface Data
Surface 6
  $K=1.71332e-002$ $A4=5.30264e-007$ $A6=-2.58605e-007$ $A8=9.57676e-009$ $A10=-2.20369e-010$
Surface 7
  $K=0.00000e+000$ $A4=-3.36066e-005$ $A6=4.41702e-006$ $A8=-6.19945e-008$ $A10=2.66086e-010$
Surface 8
  $K=-4.66725e+003$ $A4=6.12369e-006$ $A6=2.48123e-006$ $A8=-3.56033e-008$ $A10=1.16071e-010$
Surface 14
  $K=1.50820e+000$ $A4=-2.85657e-004$ $A6=-2.01177e-006$ $A8=-6.96526e-008$
Surface 21
  $K=8.30511e-001$ $A4=2.48835e-005$ $A6=-7.65850e-007$ $A8=-7.31099e-008$ $A10=3.33349e-009$ Zoom Lens Data
Zoom Ratio 9.60

| | wide-angle end | middle | telephoto end |
|---|---|---|---|
| Focal Length | 5.82 | 21.39 | 55.89 |
| F-number | 2.93 | 3.93 | 5.81 |
| Field Angle | 31.50 | 9.47 | 3.70 |
| Image Height | 3.64 | 3.57 | 3.57 |
| Entire Lens Length | 93.50 | 93.47 | 93.52 |
| BF | 0.14 | 0.14 | 0.14 |
| d4 | 0.43 | 14.45 | 17.44 |
| d10 | 17.71 | 3.66 | 0.70 |
| d12 | 21.14 | 12.92 | 0.55 |
| d18 | 7.95 | 12.21 | 1.27 |
| d20 | 4.97 | 9.55 | 32.16 |
| d22 | 2.69 | 2.08 | 2.80 |
| Entrance Pupil Position | 21.32 | 71.67 | 81.13 |
| Exit Pupil Position | −37.65 | −111.11 | 663.60 |
| Front Principal Point | 26.24 | 88.95 | 141.72 |
| Rear Principal Point | −5.67 | −21.25 | −55.75 |

Lens Unit Data

| Lens Unit | Most-Object Side Surface | Focal Length | Lens Unit Length | Front Principal Point | Rear Principal Point |
|---|---|---|---|---|---|
| 1 | 1 | 45.04 | 8.74 | −0.44 | −5.33 |
| 2 | 5 | −10.21 | 9.23 | 0.38 | −7.13 |
| | 11 | ∞ | 9.50 | 2.68 | −2.68 |
| 3 | 13 | 20.42 | 4.98 | −5.52 | −6.65 |
| 4 | 19 | 106.92 | 2.08 | −4.19 | −5.38 |
| 5 | 21 | 34.91 | 2.03 | −0.10 | −1.46 |
| | 23 | ∞ | 1.90 | 0.78 | −0.78 |

Lens Element Data

| Lens Element | Most-Object Side Surface | Focal Length |
|---|---|---|
| 1 | 1 | −52.36 |
| 2 | 2 | 248.85 |
| 3 | 3 | 25.75 |
| 4 | 5 | −10.88 |
| 5 | 7 | −18.16 |
| 6 | 9 | 22.20 |
| 7 | 11 | 0.00 |
| 8 | 14 | 16.63 |
| 9 | 16 | 27.29 |
| 10 | 17 | −12.89 |
| 11 | 19 | 106.92 |
| 12 | 21 | 34.91 |
| 13 | 23 | 0.00 |
| 14 | 25 | 0.00 |

NUMERICAL EXAMPLE 4

Unit: mm
Surface Data

| SURFECE NO. | r | d | nd | vd | EFFECTIVE DIAMETER |
|---|---|---|---|---|---|
| 1 | 38.427 | 1.20 | 1.84666 | 23.8 | 26.00 |
| 2 | 19.784 | 5.09 | 1.59201 | 67.0 | 23.40 |
| 3 | −408.176 | 0.05 | | | 22.71 |
| 4 | 20.330 | 3.17 | 1.77250 | 49.6 | 20.35 |
| 5 | 106.840 | (variable) | | | 19.74 |
| 6 | −179.849 | 0.70 | 1.88300 | 40.8 | 14.18 |
| 7 | 7.687 | 3.42 | | | 10.93 |
| 8* | −17.198 | 0.70 | 1.85961 | 40.3 | 10.82 |
| 9 | 34.616 | 0.05 | | | 11.00 |
| 10 | 19.747 | 1.89 | | | 11.20 |
| 11 | −291.474 | (variable) | | | 11.09 |
| 12 | ∞ | 8.50 | 1.83400 | 37.2 | 8.31 |
| 13 | ∞ | (variable) | | | 7.31 |
| 14(stop) | ∞ | 0.00 | | | 7.19 |
| 15* | 10.307 | 3.74 | 1.69350 | 53.2 | 7.58 |
| 16* | −128.123 | 1.79 | | | 7.43 |
| 17 | 49.387 | 0.70 | 1.76182 | 26.5 | 7.23 |
| 18 | 9.114 | 0.57 | | | 7.08 |

-continued

| SURFECE NO. | r | d | nd | vd | EFFECTIVE DIAMETER |
|---|---|---|---|---|---|
| 19 | 42.817 | 1.78 | 1.61272 | 58.7 | 7.08 |
| 20 | −27.648 | (variable) | | | 7.56 |
| 21* | 16.290 | 2.61 | 1.69680 | 55.5 | 11.22 |
| 22 | −31.856 | 0.60 | 1.84666 | 23.8 | 11.01 |
| 23 | −1156.337 | (variable) | | | 10.85 |
| 24 | ∞ | 0.31 | 1.54427 | 70.6 | 20.94 |
| 25 | ∞ | 0.50 | 1.49400 | 75.0 | 20.94 |
| 26 | ∞ | 0.40 | | | 20.94 |
| 27 | ∞ | 0.50 | 1.49831 | 65.1 | 20.94 |
| 28 | ∞ | | | | |

Aspheric Surface Data

Surface 8

$K=-6.19780e-001$ $A4=6.94425e-006$ $A6=8.79051e-007$ $A8=-3.80364e-008$ $A10=7.53093e-010$

Surface 15

$K=-3.77904e-001$ $A4=-5.93621e-005$ $A6=-5.07014e-007$ $A8=-1.27683e-008$

Surface 16

$K=0.00000e+000$ $A4=-1.06001e-005$ $A6=-6.40443e-007$ $A8=-1.68087e-008$

Surface 21

$K=3.62892e-001$ $A4=1.65399e-005$ $A6=-2.33234e-007$ $A8=5.86676e-009$ $A10=-3.94675e-011$

Zoom Lens Data

Zoom Ratio 9.54

| | wide-angle end | middle | telephoto end |
|---|---|---|---|
| Focal Length | 6.90 | 22.14 | 65.89 |
| F-number | 3.09 | 3.82 | 5.17 |
| Field Angle | 29.30 | 9.99 | 3.40 |
| Image Height | 3.95 | 3.90 | 3.65 |
| Entire Lens Length | 83.74 | 83.70 | 83.74 |
| BF | 0.12 | 0.12 | 0.12 |
| d5 | 0.96 | 6.88 | 10.73 |
| d11 | 10.03 | 4.11 | 0.30 |
| d13 | 15.83 | 5.18 | 0.50 |
| d20 | 11.22 | 19.46 | 31.32 |
| d23 | 7.28 | 9.66 | 2.50 |
| Entrance Pupil Position | 21.82 | 47.46 | 80.65 |
| Exit Pupil Position | −61.59 | −2086.07 | 76.65 |
| Front Principal Point | 27.95 | 69.36 | 203.26 |
| Rear Principal Point | −6.77 | −22.02 | −65.77 |

Lens Unit Data

| Lens Unit | Most-Object Side Surface | Focal Length | Lens Unit Length | Front Principal Point | Rear Principal Point |
|---|---|---|---|---|---|
| 1 | 1 | 24.55 | 9.51 | 2.62 | −3.16 |
| 2 | 6 | −7.44 | 6.76 | 0.51 | −4.61 |
| | 12 | ∞ | 8.50 | 2.32 | −2.32 |
| 3 | 14 | 20.34 | 8.58 | −1.52 | −7.39 |
| 4 | 21 | 25.61 | 3.21 | −0.15 | −2.01 |
| | 24 | ∞ | 1.71 | 0.63 | −0.63 |

Lens Element Data

| Lens Element | Most-Object Side Surface | Focal Length |
|---|---|---|
| 1 | 1 | −49.63 |
| 2 | 2 | 32.02 |
| 3 | 4 | 31.99 |
| 4 | 6 | −8.33 |
| 5 | 8 | −13.28 |
| 6 | 10 | 16.23 |
| 7 | 12 | 0.00 |
| 8 | 15 | 13.91 |
| 9 | 17 | −14.78 |
| 10 | 19 | 27.68 |
| 11 | 21 | 15.82 |
| 12 | 22 | −38.70 |
| 13 | 24 | 0.00 |
| 14 | 25 | 0.00 |
| 15 | 27 | 0.00 |

NUMERICAL EXAMPLE 5

Unit: mm

Surface Data

| SURFECE NO. | r | d | nd | vd | EFFECTIVE DIAMETER |
|---|---|---|---|---|---|
| 1 | 38.807 | 1.20 | 1.84666 | 23.8 | 25.80 |
| 2 | 20.453 | 4.82 | 1.59201 | 67.0 | 23.24 |
| 3 | −611.396 | 0.05 | | | 22.51 |
| 4 | 20.069 | 3.18 | 1.77250 | 49.6 | 20.58 |
| 5 | 89.142 | (variable) | | | 19.95 |
| 6 | 233.360 | 0.70 | 2.16000 | 33.0 | 13.34 |
| 7 | 8.457 | 3.22 | | | 10.76 |
| 8* | −14.855 | 0.70 | 1.77250 | 49.6 | 10.63 |
| 9 | 88.298 | 0.05 | | | 10.87 |
| 10 | 23.504 | 1.71 | 2.20000 | 15.0 | 11.04 |
| 11 | −629.271 | (variable) | | | 10.92 |
| 12 | ∞ | 8.50 | 1.83400 | 37.2 | 8.16 |
| 13 | ∞ | (variable) | | | 7.50 |
| 14(stop) | ∞ | 0.00 | | | 7.17 |
| 15* | 11.426 | 3.73 | 1.69350 | 53.2 | 7.51 |
| 16* | −54.070 | 2.44 | | | 7.54 |
| 17 | −621.928 | 0.70 | 1.76182 | 26.5 | 7.30 |
| 18 | 10.119 | 1.61 | | | 7.24 |
| 19 | 24.485 | 2.03 | 1.61272 | 58.7 | 7.92 |
| 20 | −25.706 | (variable) | | | 8.29 |
| 21* | 15.917 | 2.40 | 1.69680 | 55.5 | 10.90 |
| 22 | −63.287 | 0.60 | 1.84666 | 23.8 | 10.63 |
| 23 | 86.993 | (variable) | | | 10.45 |
| 24 | ∞ | 0.31 | 1.54427 | 70.6 | 20.94 |
| 25 | ∞ | 0.50 | 1.49400 | 75.0 | 20.94 |
| 26 | ∞ | 0.40 | | | 20.94 |
| 27 | ∞ | 0.50 | 1.49831 | 65.1 | 20.94 |
| 28 | ∞ | | | | |

Aspheric Surface Data

Surface 8

$K=-1.89552e-001$ $A4=-7.07813e-006$ $A6=3.26580e-007$ $A8=-2.72063e-008$ $A10=1.21881e-010$

Surface 15

$K=-3.86616e-001$ $A4=-5.99913e-005$ $A6=-5.94241e-007$ $A8=-2.36019e-008$

Surface 16

K=0.00000e+000 A4=−1.21343e−005 A6=−9.12993e−007 A8=−2.57590e−008

Surface 21

K=2.72477e−001 A4=1.08980e−005 A6=9.69793e−008 A8=−4.30760e−009 A10=1.13668e−010

Zoom Lens Data

Zoom Ratio 9.55

|  | wide-angle end | middle | telephoto end |
|---|---|---|---|
| Focal Length | 6.36 | 22.00 | 60.69 |
| F-number | 3.09 | 3.91 | 4.86 |
| Field Angle | 31.10 | 10.10 | 3.60 |
| Image Height | 3.95 | 3.90 | 3.65 |
| Entire Lens Length | 83.61 | 83.56 | 83.67 |
| BF | 0.14 | 0.14 | 0.14 |
| d5 | 0.76 | 7.16 | 11.37 |
| d11 | 10.79 | 4.40 | 0.30 |
| d13 | 15.32 | 3.83 | 0.50 |
| d20 | 10.47 | 19.01 | 29.06 |
| d23 | 6.77 | 9.66 | 2.95 |
| Entrance Pupil Position | 19.85 | 44.99 | 81.87 |
| Exit Pupil Position | −58.47 | −258.16 | 166.58 |
| Front Principal Point | 25.52 | 65.12 | 164.69 |
| Rear Principal Point | −6.21 | −21.85 | −60.56 |

Lens Unit Data

| Lens Unit | Most-Object Side Surface | Focal Length | Lens Unit Length | Front Principal Point | Rear Principal Point |
|---|---|---|---|---|---|
| 1 | 1 | 25.17 | 9.25 | 2.37 | −3.23 |
| 2 | 6 | −7.21 | 6.38 | 0.34 | −4.51 |
|  | 12 | ∞ | 8.50 | 2.32 | −2.32 |
| 3 | 14 | 19.73 | 10.51 | 0.64 | −8.24 |
| 4 | 21 | 30.72 | 3.00 | −0.62 | −2.32 |
|  | 24 | ∞ | 1.71 | 0.63 | −0.63 |

Lens Element Data

| Lens Element | Most-Object Side Surface | Focal Length |
|---|---|---|
| 1 | 1 | −52.65 |
| 2 | 2 | 33.52 |
| 3 | 4 | 32.87 |
| 4 | 6 | −7.58 |
| 5 | 8 | −16.41 |
| 6 | 10 | 18.91 |
| 7 | 12 | 0.00 |
| 8 | 15 | 13.93 |
| 9 | 17 | −13.06 |
| 10 | 19 | 20.79 |
| 11 | 21 | 18.48 |
| 12 | 22 | −43.19 |
| 13 | 24 | 0.00 |
| 14 | 25 | 0.00 |
| 15 | 27 | 0.00 |

TABLE 1

| | CONDITIONAL EXPRESSION | | | | | | |
|---|---|---|---|---|---|---|---|
| | 1 | 2 | 3 | 4 | 5 | 6 | 7 |
| NUMERICAL EXAMPLE 1 | 2.11 | 0.355 | 1.883 | 0.569 | 1.923 | 18.8 | 0.805 |
| NUMERICAL EXAMPLE 2 | 2.97 | 0.219 | 1.883 | 0.880 | 1.923 | 18.8 | 0.774 |
| NUMERICAL EXAMPLE 3 | 1.76 | 0.407 | 1.860 | 0.400 | 1.923 | 18.8 | 0.997 |
| NUMERICAL EXAMPLE 4 | 2.87 | 0.217 | 1.883 | 0.870 | 2.144 | 17.8 | 0.762 |
| NUMERICAL EXAMPLE 5 | 2.73 | 0.222 | 2.160 | 0.781 | 2.200 | 15.0 | 0.795 |

As described above, each of Embodiments 1 to 5 can provide a retractable bent-type zoom lens capable of retracting into a camera body with an easily-configured mechanism.

Furthermore, the present invention is not limited to these embodiments and various variations and modifications may be made without departing from the scope of the present invention.

This application claims the benefit of Japanese Patent Application No. 2008-117297, filed on Apr. 28, 2008, which is hereby incorporated by reference herein in its entirety.

INDUSTRIAL APPLICABILITY

The present invention can provide a retractable bent-type zoom lens capable of retracting into a camera body.

The invention claimed is:

1. A zoom lens comprising in order from an object side to an image side:

a first lens unit having a positive refractive power;

a second lens unit having a negative refractive power;

a prism including a reflective surface which bends an optical path; and a posterior lens group which includes plural lens units and has as a whole a positive refractive power, wherein the first lens unit and the second lens unit are retractable into a space formed by movement of the prism in a direction orthogonal to an optical axis of the first lens unit, and wherein, during zooming, the second lens unit and the plural lens units in the posterior lens group are moved while the first lens unit and the prism are unmoved.

2. A zoom lens according to claim 1, wherein the following condition is satisfied:

$$1.5 < |\sqrt{(fw \cdot ft)}/f2| < 5.0$$

where f2 represents a focal length of the second lens unit, and fw and ft respectively represent focal lengths of the entire zoom lens at a wide-angle end and at a telephoto end.

3. A zoom lens according to claim 1, wherein the following condition is satisfied:

$$0.2 < Zr/Z < 0.8$$

where Zr represents a variable magnification ratio of the posterior lens group, and Z represents a variable magnification ratio of the entire zoom lens.

4. A zoom lens according to claim 1, wherein the second lens unit includes negative lens elements, and
wherein the following condition is satisfied:

$$1.84 < N2max < 2.40$$

where N2max represents a refractive index for a d-line of a material forming a negative lens element having a maximum refractive power among the negative lens elements in the second lens unit.

5. A zoom lens according to claim 1, wherein the following condition is satisfied:

$$0.4 < \sqrt{(fw \cdot ft)}/f1 < 1.2$$

where f1 represents a focal length of the first lens unit, and fw and ft respectively represent focal lengths of the entire zoom lens at a wide-angle end and at a telephoto end.

6. A zoom lens according to claim 1, wherein the second lens unit includes only one positive lens element, and
wherein the following conditions are satisfied:

$$1.84 < N2p < 2.30$$

$$5 < v2p < 24$$

where N2p and v2p respectively represent a refractive index for a d-line of a material forming the one positive lens element and an Abbe constant of the material.

7. A zoom lens according to claim 1, wherein the following condition is satisfied:

$$0.4 < (T1+T2)/\sqrt{(fw \cdot ft)} < 1.3$$

where T1 and T2 respectively represent thicknesses of the first lens unit and the second lens unit on the optical axis, and fw and ft respectively represent focal lengths of the entire zoom lens at a wide-angle end and at a telephoto end.

8. A zoom lens according to claim 1, wherein, during zooming from a wide-angle end to a telephoto end, all the lens units other than the first lens unit and the prism are moved.

9. A camera comprising:
a zoom lens including, in order from an object side to an image side, a first lens unit having a positive refractive power, a second lens unit having a negative refractive power, a prism including a reflective surface which bends an optical path, and a posterior lens group which includes plural lens units and has as a whole a positive refractive power, wherein the first lens unit and the second lens unit are retractable into a space formed by movement of the prism in a direction orthogonal to an optical axis of the first lens unit, and wherein, during zooming, the second lens unit and the plural lens units in the posterior lens group are moved while the first lens unit and the prism are unmoved; and
a photoelectric conversion element which receives an optical image formed by the zoom lens.

10. A camera according to claim 9, wherein the following condition is satisfied:

$$1.5 < |\sqrt{(fw \cdot ft)}/f2| < 5.0$$

where f2 represents a focal length of the second lens unit, and fw and ft respectively represent focal lengths of the entire zoom lens at a wide-angle end and at a telephoto end.

11. A camera according to claim 9, wherein the following condition is satisfied:

$$0.2 < Zr/Z < 0.8$$

where Zr represents a variable magnification ratio of the posterior lens group, and Z represents a variable magnification ratio of the entire zoom lens.

12. A camera according to claim 9, wherein the second lens unit includes only one positive lens element, and
wherein the following condition is satisfied:

$$1.84 < N2max < 2.40$$

where N2max represents a refractive index for a d-line of a material forming a negative lens element having a maximum refractive power among the negative lens elements in the second lens unit.

13. A camera according to claim 9, wherein the following condition is satisfied:

$$0.4 < \sqrt{(fw \cdot ft)}/f1 < 1.2$$

where f1 represents a focal length of the first lens unit, and fw and ft respectively represent focal lengths of the entire zoom lens at a wide-angle end and at a telephoto end.

14. A camera according to claim 9, wherein the second lens unit includes only one positive lens element, and
wherein the following condition is satisfied:

$$1.84 < N2p < 2.30$$

$$5 < v2p < 24$$

where N2p and v2p respectively represent a refractive index for a d-line of a material forming the one positive lens element and an Abbe constant of the material.

15. A camera according to claim 9, wherein the following condition is satisfied:

$$0.4 < (T1+T2)/\sqrt{(fw \cdot ft)} < 1.3$$

where T1 and T2 respectively represent thicknesses of the first lens unit and the second lens unit on the optical axis, and fw and ft respectively represent focal lengths of the entire zoom lens at a wide-angle end and at a telephoto end.

16. A camera according to claim 9, wherein, during zooming from a wide-angle end to a telephoto end, all the lens units other than the first lens unit and the prism are moved.

* * * * *